US010974412B2

(12) United States Patent
Waterman et al.

(10) Patent No.: US 10,974,412 B2
(45) Date of Patent: Apr. 13, 2021

(54) MACHINE FOR CUTTING POUCHES WITH SHAPED PERIMETER EDGE, METHOD AND POUCH

(71) Applicant: CLOUD PACKAGING SOLUTIONS LLC, Des Plaines, IL (US)

(72) Inventors: Alexander J. Waterman, Mount Prospect, IL (US); Donn D. Hartman, Hawthorn Woods, IL (US); Gregory Wilmes, Chicago, IL (US); Anthony Crivollo, Elk Grove Village, IL (US)

(73) Assignee: Cloud Packaging Solutions LLC, Des Plaines, IL (US)

( * ) Notice: Subject to any disclaimer, the term of this patent is extended or adjusted under 35 U.S.C. 154(b) by 256 days.

(21) Appl. No.: 15/812,601

(22) Filed: Nov. 14, 2017

(65) Prior Publication Data
US 2018/0133919 A1    May 17, 2018

Related U.S. Application Data

(60) Provisional application No. 62/422,346, filed on Nov. 15, 2016.

(51) Int. Cl.
*B26F 1/38* (2006.01)
*B26D 7/10* (2006.01)
(Continued)

(52) U.S. Cl.
CPC ............ *B26F 1/384* (2013.01); *B26D 7/10* (2013.01); *B65B 47/10* (2013.01); *B65B 61/08* (2013.01);
(Continued)

(58) Field of Classification Search
CPC .......... B26F 1/38; B26F 1/384; B26F 1/3846; B26F 1/3853; B26D 7/08; B26D 7/10
See application file for complete search history.

(56) References Cited

U.S. PATENT DOCUMENTS 2,497,212 A * 2/1950 Donofrio .............. B29C 51/445
53/443
2,513,852 A 7/1950 Donofrio
(Continued)

FOREIGN PATENT DOCUMENTS

DE    93 03 456 U1    4/1993
EP    2 834 154 B1    4/2016
(Continued)

OTHER PUBLICATIONS

European Patent Office, International Search Report, of the International Searching Authority, in International Application No. PCT/US2017/061573 (dated Mar. 19, 2018).
(Continued)

*Primary Examiner* — Andrea L. Wellington
*Assistant Examiner* — Richard D Crosby, Jr.
(74) *Attorney, Agent, or Firm* — Leydig, Voit & Mayer, Ltd.

(57) ABSTRACT

Apparatus and method for separating product containing pouches from a travelling web of adhered films carried on a film support surface includes a rotary blade drum assembly having blade configurations with blade portions arranged to form the entire perimeter edge of the flange of the pouch which rotate in synchronous registration with grooves in the film support surface. In one form, at least one blade portion and associated groove portion are non-linear and other than longitudinal or transverse to the film support surface of the forming drum or travelling web of films. The blade portions may be heated and the rotary blade drum assembly may include insulating guides for the pouches.

12 Claims, 12 Drawing Sheets

(51) Int. Cl.
  B65B 61/08  (2006.01)
  B65B 47/10  (2006.01)
  B65B 61/10  (2006.01)
  B65B 9/04  (2006.01)
  B65B 47/00  (2006.01)
  B65B 57/02  (2006.01)

(52) U.S. Cl.
  CPC ............... *B65B 61/10* (2013.01); *B65B 9/04* (2013.01); *B65B 47/00* (2013.01); *B65B 57/02* (2013.01); *B65B 2009/047* (2013.01); *B65B 2220/06* (2013.01)

(56) References Cited

U.S. PATENT DOCUMENTS

| | | | | |
|---|---|---|---|---|
| 3,218,776 | A * | 11/1965 | Cloud | B65B 9/042 53/453 |
| 3,513,852 | A * | 5/1970 | Seidl | A41C 3/04 450/36 |
| 3,757,620 | A * | 9/1973 | Cloud | B26D 7/0675 83/88 |
| 4,271,739 | A * | 6/1981 | Chung | B65B 9/042 83/175 |
| 4,608,895 | A | 9/1986 | Bell et al. | |
| 4,703,765 | A * | 11/1987 | Paules | B65B 1/36 131/112 |
| 4,732,082 | A * | 3/1988 | Ireton | B21D 17/04 101/23 |
| 4,872,382 | A * | 10/1989 | Benner, Jr. | B26D 7/2628 83/152 |
| 5,083,488 | A * | 1/1992 | Stanley | B26D 7/2628 100/168 |
| 5,222,422 | A * | 6/1993 | Benner, Jr. | B26D 7/01 83/152 |
| 5,233,813 | A * | 8/1993 | Kenney | B65B 29/028 53/450 |
| 5,459,980 | A * | 10/1995 | Kenney | B65B 29/028 53/450 |
| 6,085,626 | A * | 7/2000 | Pfaff, Jr. | B26D 7/2628 83/698.51 |
| D558,921 | S | 1/2008 | Schwartz et al. | |
| 8,539,743 | B2 * | 9/2013 | Rapparini | B65B 29/022 53/561 |
| 8,662,880 | B2 * | 3/2014 | Fowler | B65B 3/04 425/388 |
| 9,162,413 | B2 | 10/2015 | Hartman et al. | |
| 10,703,515 | B2 * | 7/2020 | Hartman | B65B 3/04 |
| 2005/0120857 | A1 * | 6/2005 | Pfaff, Jr. | B26D 7/2628 83/698.51 |
| 2006/0048616 | A1 * | 3/2006 | Grenier | B26D 7/20 83/13 |
| 2008/0237386 | A1 * | 10/2008 | Aichele | B26D 7/2628 242/527.6 |
| 2008/0282860 | A1 * | 11/2008 | Pfaff, Jr. | B26D 7/1818 83/128 |
| 2009/0013830 | A1 * | 1/2009 | Pfaff, Jr. | B23P 15/406 76/107.8 |
| 2010/0162665 | A1 * | 7/2010 | Tan | B26F 1/384 53/459 |
| 2011/0030297 | A1 * | 2/2011 | Robertson | B26F 1/384 52/255 |
| 2011/0056621 | A1 * | 3/2011 | Quinn | A61F 13/0283 156/269 |
| 2011/0162497 | A1 * | 7/2011 | Yamamoto | A61F 13/15739 83/55 |
| 2011/0203435 | A1 * | 8/2011 | Smithwick | B26D 7/1818 83/114 |
| 2011/0277606 | A1 * | 11/2011 | Park | B26D 7/2614 83/100 |
| 2012/0006172 | A1 * | 1/2012 | Kruger | B26D 5/083 83/592 |
| 2012/0036973 | A1 * | 2/2012 | Eisemann | B26F 1/384 83/346 |
| 2012/0055305 | A1 * | 3/2012 | Betti | B26D 1/626 83/436.3 |
| 2012/0121802 | A1 * | 5/2012 | Zimmer | C08L 23/02 427/207.1 |
| 2012/0234145 | A1 * | 9/2012 | Kandemir | B26D 7/204 83/56 |
| 2012/0272804 | A1 * | 11/2012 | Miyauchi | A61F 13/15723 83/100 |
| 2013/0000457 | A1 * | 1/2013 | Oba | B26D 7/2628 83/344 |
| 2013/0025423 | A1 * | 1/2013 | Nakano | B26F 1/384 83/76 |
| 2013/0094891 | A1 * | 4/2013 | Annerstedt | B26D 9/00 400/621 |
| 2013/0098545 | A1 * | 4/2013 | Schroeder | B32B 37/144 156/265 |
| 2014/0041493 | A1 * | 2/2014 | Dulaney | B26F 1/384 83/13 |
| 2014/0090206 | A1 * | 4/2014 | Obiol | B26D 7/00 16/422 |
| 2014/0154350 | A1 * | 6/2014 | Hammond | B65B 47/02 425/403 |
| 2014/0224090 | A1 * | 8/2014 | Ruiz Bernal | B26F 1/10 83/566 |
| 2014/0260851 | A1 * | 9/2014 | Beaudry | B26D 7/2614 83/56 |
| 2014/0318340 | A1 * | 10/2014 | Mochizuki | B26D 5/32 83/346 |
| 2015/0065323 | A1 | 3/2015 | Hartman et al. | |
| 2015/0135925 | A1 * | 5/2015 | Abrahams | B26D 7/204 83/659 |
| 2015/0300800 | A1 * | 10/2015 | VanValkenburgh | G01S 17/88 324/207.17 |
| 2017/0088298 | A1 | 3/2017 | McLenithan et al. | |
| 2018/0133919 | A1 * | 5/2018 | Waterman | B65B 47/10 |

FOREIGN PATENT DOCUMENTS

| | | |
|---|---|---|
| GB | 231 4312 A | 12/1997 |
| GB | 2 475 538 A | 5/2011 |
| GB | 2475 538 A | 5/2011 |
| JP | 2005 014211 A | 1/2005 |
| WO | WO 00/55044 A1 | 9/2000 |
| WO | WO 2014/170882 A1 | 10/2014 |
| WO | WO 2016/054459 A1 | 4/2016 |

OTHER PUBLICATIONS

European Patent Office, Written Opinion of the International Searching Authority, in International Application No. PCT/US2017/061573 (dated Mar. 19, 2018).

European Patent Office, Communication pursuant to Article 94(3) EPC in European Patent Application No. 17 804 780.9 (dated Sep. 8, 2020).

* cited by examiner

MACHINE FOR CUTTING POUCHES WITH SHAPED PERIMETER EDGE, METHOD AND POUCH

CROSS-REFERENCE TO RELATED APPLICATIONS

This application claims priority pursuant to Title 35 USC § 19(e) to U.S. provisional application Ser. No. 62/422,346, filed Nov. 15, 2016, for "Machine for Cutting Pouches with Shaped Perimeter Edge, Method and Pouch," the entire specification and drawings of which are hereby incorporated by reference herein as if fully set forth.

BACKGROUND

This disclosure relates to flexible, composition containing pouches formed of polymeric film and the apparatus and method of making them. More particularly, it is related to a mechanism for separating completed pouches from a travelling web of adhered film material, the method of doing so and the resultant pouches.

Flexible pouches made of polymeric film and filled with a consumable product are commonly produced on equipment having an array of pouch forming mold configurations. These pouch forming mold configurations are often incorporated into a rotating drum, or axially movable platen. Examples of such forming, filling and sealing systems include U.S. Pat. No. 3,218,776, issued Nov. 23, 1965 to Charles E. Cloud, and U.S. Pat. No. 9,162,413, issued to Cloud Packaging Solutions, LLC, the entire contents of which are hereby incorporated herein by reference as if fully set forth.

Machines or systems are known for forming flexible sealed pouches or packages containing a consumable product. Such pouches may be made from two continuous films in which a first or base film is vacuum formed into mold configurations on a rotating forming drum to define pockets to be filled with one or more products or materials and subsequently closed by a second or lid film. Some more recent configurations include multiple compartment pouches, and pouches in which more than two films are employed.

A known two-layer pouch may be made of PVA or similar soft, deformable polymeric material. It includes a central product containing chamber having a perimeter seal defined by the edge of the mold configuration of a forming drum. Typically, the process for separation of the completed pouches from the web of adhered films results in creation of a perimeter flange that has a rectangular or square perimeter edge configuration. On release of a completed pouch from its mold cavity, the known shrinkage of the base film and complementary stretch or expansion of the lid film cause the resultant shape of a completed pouch.

Traditionally, the formed and filled pouches are cut from the continuous web of adhered films using stationary slitting blades that cut the moving web into longitudinal strips. Thereafter, rotating transverse blades cut the strips between rows of pouches to separate the strips into individual pouches. The result is a filled pouch with a perimeter flange of surrounding material comprising adhered layers of film having a rectangular or square perimeter edge.

A modern example of such a machine and process for forming such pouches is disclosed in previously identified U.S. Pat. No. 9,162,413.

The foregoing process is particularly suitable for producing flexible packages from water soluble film, such as polyvinyl alcohol (PVA). A highly successful application involves manufacture of individual dosage pouches of liquid laundry detergent and/or liquid dish washing detergent, though other commercial applications are also known.

The industry has, for some time, contemplated production of formed filled and sealed pouches with a more cost effective, or attractive shape, particularly, a pouch with a unique rectangular surrounding perimeter flange. This disclosure provides mechanism and method for separating pouches that attain those goals. In particular, it provides the capability to produce pouch shapes having non-rectangular perimeter edges resulting in unique and attractive pouch shapes that were heretofore unobtainable.

SUMMARY

Apparatus and method for separating product containing pouches from a travelling web of adhered films carried on a film support surface includes a rotary blade drum assembly having blade configurations with blade portions arranged to form the entire perimeter edge of the flange of the pouch which rotate in synchronous registration with grooves in the film support surface. In one form, at least one blade portion and associated groove portion are non-linear and other than longitudinal or transverse to the film support surface of the forming drum or travelling web of films. The blade portions may be heated and the rotary blade drum assembly may include insulating guides for the pouches.

Apparatus for separating product containing pouches from a travelling web of adhered films includes a film support surface carrying adhered films and provided with at least one pouch forming mold configuration and surrounding groove portions. A rotary blade drum assembly with blade portions to form the entire perimeter edge of a flange of the pouch is disposed for synchronous registration with the groove portions. Rotation of the rotary blade drum causes the blade portions to enter the groove portions through the travelling web of adhered films and form the perimeter edge of the flange of the pouch and separate the pouch from the travelling web of adhered films.

The film support surface includes intersecting generally longitudinal groove portions and generally transverse groove portions, and the rotary blade drum assembly includes intersecting generally longitudinal blade portions and generally transverse blade portions configured for synchronous registration. In one form, at least one of the generally longitudinal blade portions or generally transverse blade portions is non-linear relative to the longitudinal or transverse extent of the forming drum or travelling web of adhered films. The rotary blade drum assembly may include heating elements to heat the blade portions to a temperature sufficient to melt the adhered web of films and insulating pads or guides disposed within each blade configuration arranged to define a generally cylindrical forming drum contact surface to contact pouches being separated from the travelling web of adhered films.

A method of separating product containing pouches from a travelling web of adhered films defining a plurality of pouches carried by the web includes providing a film support surface for carrying the web and having a plurality of transverse rows of mold configurations defining mold cavities, each supporting a pouch therein, with a plurality of generally longitudinal and generally transverse groove portions surrounding each mold configuration; providing a rotary blade drum assembly in operative relation with the film support surface having blade configurations with blade portions arranged to form the entire perimeter edge of the flange of each pouch disposed for synchronous registration with the groove portions of the film support surface to cause the blade portions to enter the groove portions through the travelling web of adhered films to form a perimeter edge of each flange of each pouch, and causing synchronous registrations of the blade portions and groove portions to separate the pouches from the travelling web of adhered films.

A forming drum for separating product containing pouches from a travelling web of adhered films comprises a film support surface for carrying the web of adhered films with a plurality of pouch forming mold configurations with groove portions surrounding each mold configuration including intersecting generally longitudinal groove portions and generally transverse groove portions arranged for synchronous registration with blade portions on an associated rotary blade drum assembly with at least one of the groove portions of each mold configuration being non-linear relative to the longitudinal or transverse extent of the forming drum.

A rotary blade drum assembly for separating product containing pouches from a travelling web of adhered films carried on a film support surface with a plurality of pouch forming mold configurations each surrounded by groove portions includes blade configurations with blade portions arranged to form the perimeter edge of a flange of a pouch and arranged for synchronous registration with the groove portions in the forming drum, rotation of forming drum and rotary blade drum causing the blade portions to enter the groove portions through the travelling web of adhered films and form the perimeter edge of the flange of the pouch and separate pouches from the travelling web of adhered films.

A product containing pouch of adhered films defines at least one interior volume with a perimeter flange having a perimeter edge defined by intersecting generally longitudinal and generally transverse edge portions, where at least one of the edge portions is non-linear.

DETAILED DESCRIPTION OF THE DRAWINGS

DETAILED DESCRIPTION OF THE ILLUSTRATED EMBODIMENTS

In this disclosure, longitudinal or circumferential means in the direction of movement of the travelling web of adhered films or perpendicular to the axis of rotation of the base forming drum. Transverse or lateral means across the film, or parallel to the axis of rotation of the drum. Also, in reference to the web of combined films, "longitudinally" means along the length of the web of films. "Transversely" means across the films of the web from edge-to-edge. The term "non-linear" means not parallel to the longitudinal or transverse extent of the forming drum or travelling web of adhered films.

Figure 1:
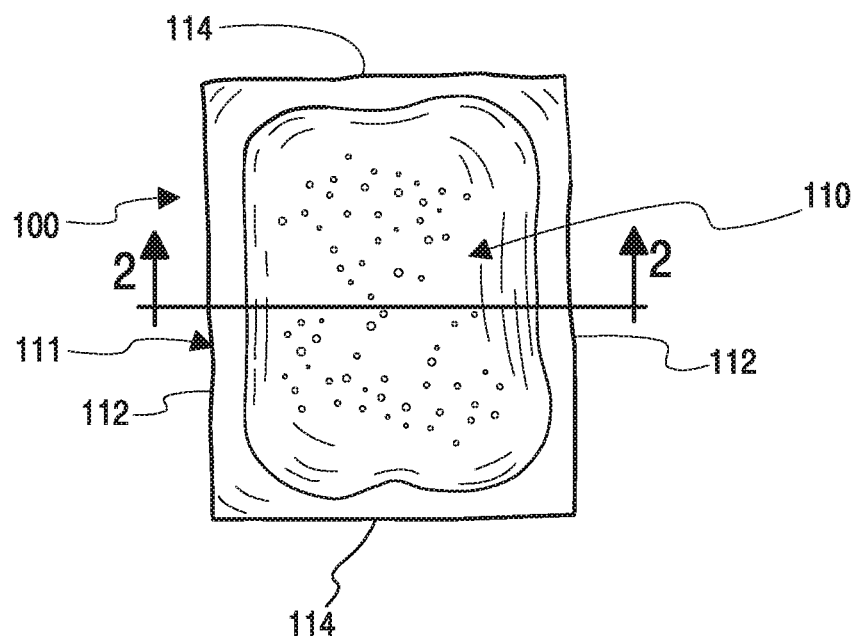
FIG. 1 is a top view of a flexible product containment pouch configuration.
Figure 2:
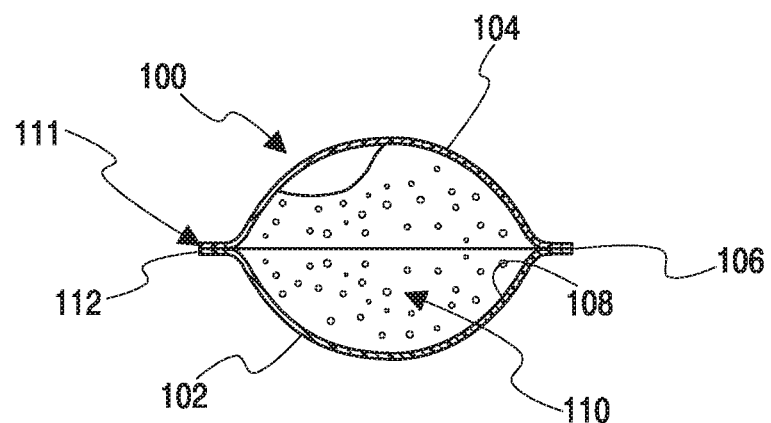
FIG. 2 is a cross-sectional view of the pouch of FIG. 1 taken along the line 2-2 of FIG. 1.

Turning now to the drawings, FIGS. 1 and 2 are illustrative of a flexible containment pouch 100 formed by joinder of two polymeric films. The films could be water soluble polyvinyl alcohol, though other films could be used. The films used are "soft" and form "soft" blisters once thermoformed from PVA, polyethylene, or other suitable polymeric film.

Typical film thicknesses for soft blister pouches are 0.001" (inch) to 0.004" (inch) thick. The formed stock, sometimes called the base film is typically around 0.003" (inch) thick and the lid stock or lid film is typically thinner, usually around 0.002" (inch) thick, though these thicknesses not requisite for the principles of this disclosure.

Referring to FIGS. 1 and 2, pouch 100 includes a base film 102 and a lid film 104 joined along a sealed interface 106 of adhered films. It defines a hollow interior volume containing a product component 110, in this illustration, a liquid composition.

The pouch 100 has a generally rectangular perimeter flange 111 with parallel longitudinal edge portions 112 and parallel transverse edge portions 114.

The pouch 100 of FIGS. 1 and 2 is illustrative of a resultant product that may be produced in accordance with the principles of this disclosure. It is, however, only illustrative and, as explained in detail below, the principles disclosed herein have a wide range of applicability and benefit, including production of shaped pouches not previously attainable.

Figure 3:
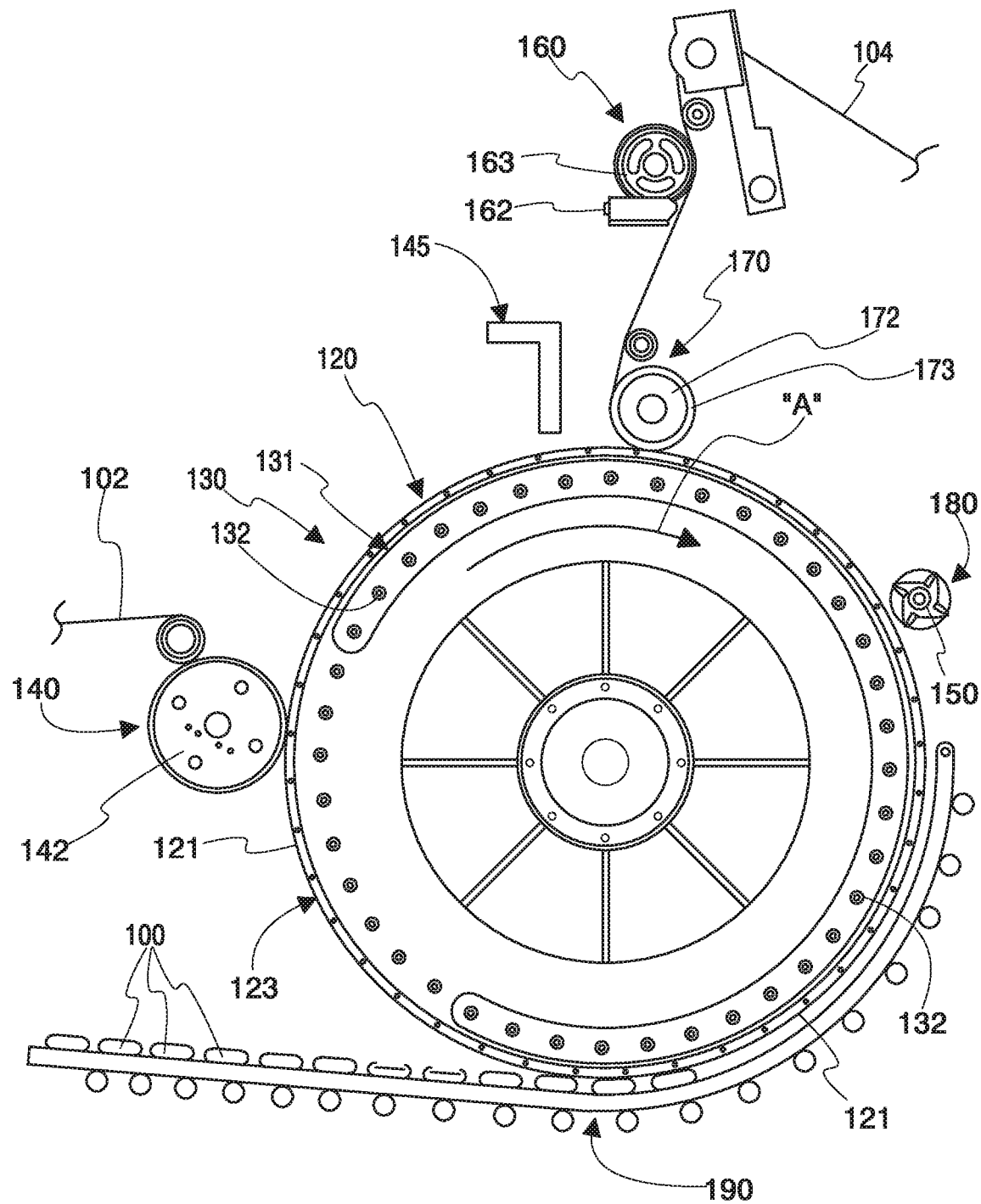
FIG. 3 is a schematic view of an exemplary rotary form, fill and seal machine for making pouches in accordance herewith.

FIG. 3 is a representation of a rotary pouch forming and filling apparatus suitable for producing a plurality of the pouches 100 depicted in FIGS. 1 and 2, in accordance with the principles of the present disclosure, as well as the unique pouches depicted in FIGS. 4 and 5, 11 or 12, all as discussed further below. The pouch forming apparatus is generally similar to that disclosed in aforementioned U.S. Pat. No. 9,162,413. Of course, the principles disclosed are fully applicable to other pouch forming apparatus, including, but not limited to, movable platen machines.

A rotatable base forming drum 120 includes multiple transverse rows of pouch forming mold configurations defining mold cavities to produce multiple pouches simultaneously. Typically, the rotary drum 120 is formed of a plurality of long bars 121 supported on a wheel and defining an outer film support surface 123. Each bar 121 includes multiple mold configurations or cavities extending inward of the drum from film support surface 123. As described in detail with respect to the embodiment of the disclosure discussed with reference to FIGS. 4 through 10, film support surface 123 of base forming drum 120 includes generally circumferential or longitudinal and generally transverse grooves surrounding each mold configuration that parallel the shape of the edge defining the cavity of each mold configuration.

The pouch forming apparatus additionally includes a vacuum system 130, a heater system 140, a product feed mechanism 145, a wetting system 160, a sealing system 170, a pouch separation station 180, and rolls of material that supply base film 102, and lid film 104.

Vacuum system indicated generally at 130 in FIG. 3, includes conduits 132, operatively connected to each mold configuration to create a vacuum to draw a portion of the base film 102 into the mold cavities to form product receiving pockets in base film 102. Such a vacuum system is well known in the art. A drive system (not shown) is operatively connected to the base forming drum 120 to rotate the drum continuously about its axis in direction "A."

The heater system 140 is depicted as a rotatable base film heater roller 142 positioned adjacent the base forming drum 120. It includes an internal element to heat the base film 102 prior to it contacting the film support surface 123 of base forming drum 119 or being drawn into mold configurations to form product pockets. The heater system 140 may be configured as a cartridge-type heater within the base film heater roller 142 but other types of heaters, either internal or external to a roller, may be used if desired. In a typical method of thermoforming, for example, PVA or similar film, on a rotary drum form fill and seal pouch machine, the film is heated to a range of 140° F. to 400° F. depending on film thickness, type of film and other operational parameters.

A product feed mechanism 145 is positioned generally adjacent the base forming drum 120 to supply one or more product components into each product pocket as the pockets, together with base film 102, move along with the film support surface 123. Product feed mechanisms 145 are well known in the art and may take any known form. Such mechanisms may be configured to feed any desired type of composition, number or combination of individual products and/or materials, preferably including a liquid composition. Of course the product could comprise a gel, a solid, a powder, a paste or wax-type products, pills, tablets, or even other pouched products.

A supply roll of continuous film material provides the lid film 104. The lid film 104 is aligned with the base film 102 so as to come into overlying contact with the base film 102 after the filling of the pockets in the base film. The illustrated lid wetting system 160 helps create a strong seal between the base film and lid film. It is positioned adjacent the lid film 104 at a position upstream of where the lid film 104 seals the base film 102 at the base forming drum 120.

The lid wetting system 160 may apply a solvent to the lid film 104 to increase its tackiness to assist in adhering the lid film 104 to the base film 102. To do so, the solvent may be provided through a wetting reservoir 162 to a wetting roller 163 that engages the lid film 104. In instances where the base film 102 and lid film 104 are formed of a polyvinyl alcohol material, the solvent for the lid wetting system 160 may be water.

A sealing system 170 having a sealing roller 172 is positioned in close contacting relation to the film support surface 123 of base forming drum 120. Lid film 104 passes around sealing roller 172 and is urged into sealing contact with base film 102 to urge the contacting surfaces of base film 102 and lid film 104 into adhering, sealed relation. In this regard, the sealing roller 172 is mounted such that it applies pressure to the overlying films to perfect the sealing relationship. Sealing roller 172 may include an outer layer 173 formed of material that is deformable, such as a rubber or similar material, though this is not essential. Typically, this material has a thickness of about one-half inch (½") and a durometer of about 60, though these values may vary. The material, and the pressure exerted on the overlying films, assures effective contact of base film 102 and lid film 104 along the sealed interface 106. Of course, depending on the film material, it is also known to use heat, ultrasonic welding or other similar process to seal the lid film and base film together to form a completed pouch.

Pouches formed of polymeric material, such as polyvinyl alcohol, are prone to shrinkage and distortion after forming, filling and sealing. When located in the cavity, the applied vacuum through conduits 132 retains the shape dictated by the mold configuration. Once released, however, the pouch base pocket shrinks to a smaller volume, sometimes up to twenty or more percent (20%) smaller. Because the pouch 100 is sealed, the shrinkage is accommodated with stretching of lid film 104 to form the shape shown in FIG. 2. Often lid film 104 is a thinner material than base film 102 to augment the expansion characteristic of the lid film.

The foregoing mechanism comprises a typical rotary form fill and seal pouch forming machine with a base forming drum carrying a travelling web of adhered films interspersed with filled product component chambers. The description to follow describes apparatus and method in accordance with this disclosure for removal of the product component pouches from the travelling web. This apparatus and method provide the capability to produce individual pouches of unique configurations.

A pouch separation system 180 is positioned after, or downstream from the location at which the base film 102 and the lid film 104 are secured together to form the web of adhered films. It comprises a rotary blade drum assembly 150 configured in accordance herewith to coact with the base forming drum 120 to individually separate each completed pouch from the travelling web of adhered films.

The cooperative machine elements and their functional coaction are illustrated and described in detail below in relation to production of a unique pouch configuration illustrated in FIG. 4. The surrounding flange of this pouch has non-linear perimeter edge portions. As illustrated in additional embodiments below, the disclosed apparatus and method possess the capability to produce any number of variations of pouches with flanges having non-linear perimeter edge portions in either the longitudinal or the transverse direction of the web of adhered films. It is also to be understood that the systems and principles disclosed herein are employed in the pouch separation station 180 of FIG. 3 for production of pouches as illustrated in FIGS. 1 and 2, having a rectangular perimeter flange and linear longitudinal and transverse edge portions.

A preferred apparatus and method for creating shaped pouches in accordance with this disclosure is disclosed in reference to FIGS. 4 to 10. In this embodiment, a pouch separation station 280 is illustrated and described.

Figure 4:
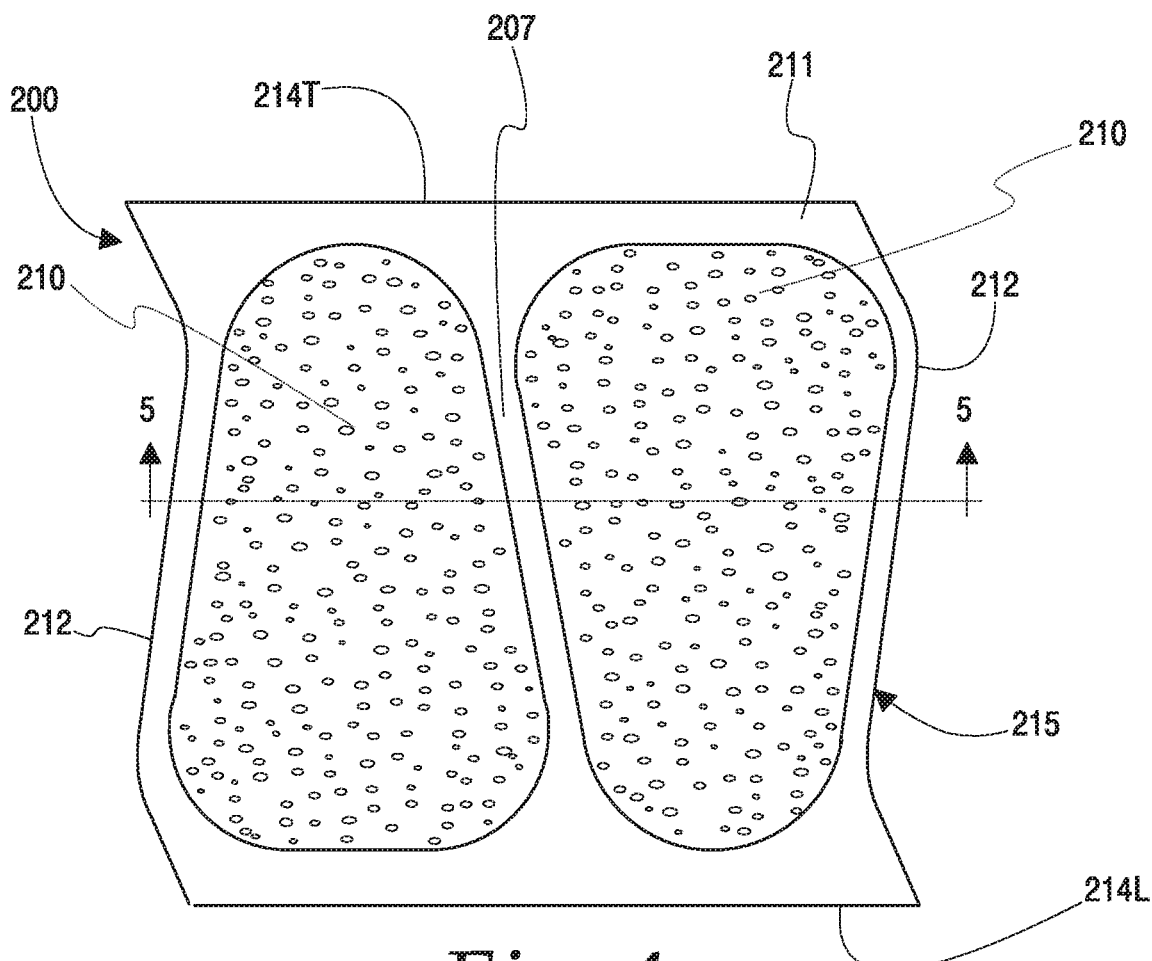
FIG. 4 is a top view of a flexible product containment pouch produced in accordance with the principles of this disclosure.
Figure 5:
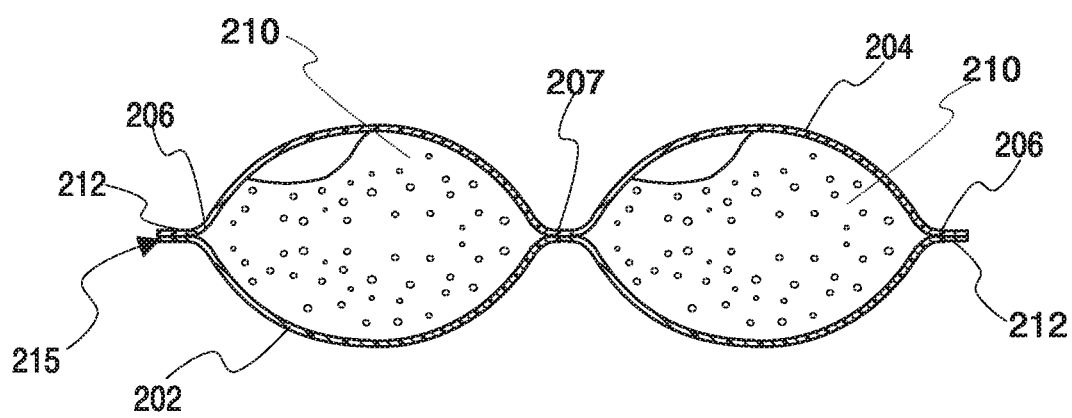
FIG. 5 is a cross-sectional view of the pouch of FIG. 4 taken along the line 5-5 of FIG. 4.

Referring to FIGS. 4 and 5, illustrative pouch 200 includes a base film 202 and a lid film 204 joined along a sealed interface 206 to form a web of adhered films. Two separate interior volumes are separated by web 207 of adhered films 202 and 204. Each separate volume contains a product component 210, which may be the same or a different composition, usually a liquid, or other suitable material.

Pouch 200 includes a surrounding flange 211 formed by the adhered films. In this illustration, flange 211 has non-linear longitudinal edge portions 212 and parallel, linear edge portions 214 (designated 214L or 214T in FIG. 4) that together define the perimeter edge 215 of the pouch 200. Here, longitudinal edge portions of perimeter edge 215 present a wavy or zig-zag shape. Though illustrated as a combination of straight lines, the edge portions 212 or 214 could be any shape, including curved or arcuate. Moreover, either of the edge portions could be oblique to the longitudinal or transverse extent of the forming drum or travelling web of adhered films from which the pouch is separated and, in that sense, non-linear.

Figure 7:
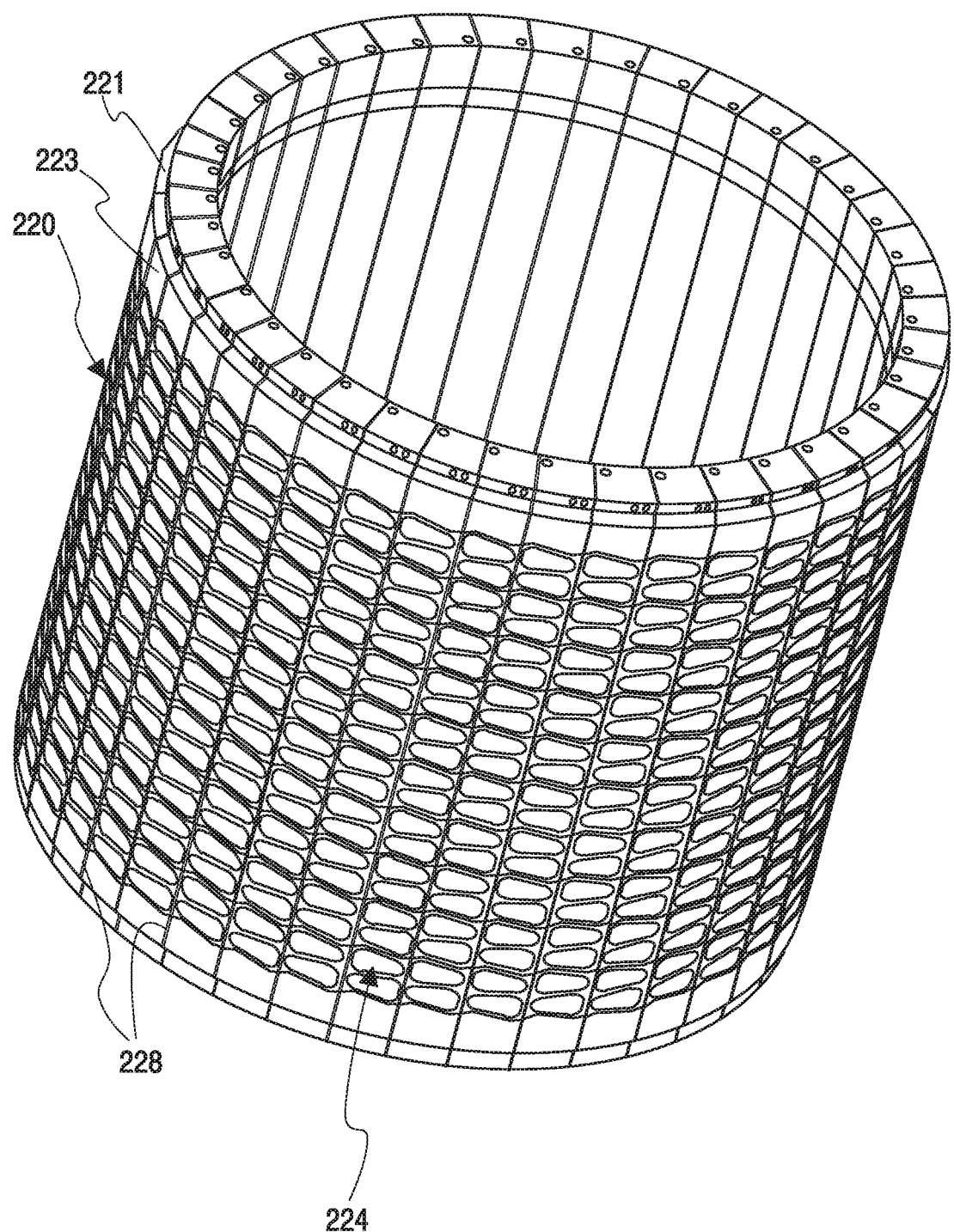
FIG. 7 is a perspective view of a plurality of long bars as shown in FIG. 6, assembled to form a base forming drum, such as the base forming drum of FIG. 3.

As in the earlier machine, described in connection with FIG. 3, base forming drum 220, a portion of which is seen in FIG. 7, includes cylindrical outer film support surface 223 formed by the exterior surface of assembled long bars 221. As illustrated in FIG. 7, each long bar 221 includes a plurality of rows of mold configurations 224. In operation, the base film 202 for a pouch is supported upon the outer film support surface 223 during the pouch forming and filling steps of the pouch making process. After filling, lid film 204 is adhered to the base film 202 in the well-known manner. Rotating base forming drum 220 carries the travelling web of adhered films through the pouch production process. The combined web of adhered films of two or more layers then advance to the pouch separation system 280, seen in FIGS. 9 and 10, with the completed pouches retained by vacuum within the cavities of mold configurations 224.

Figure 6:
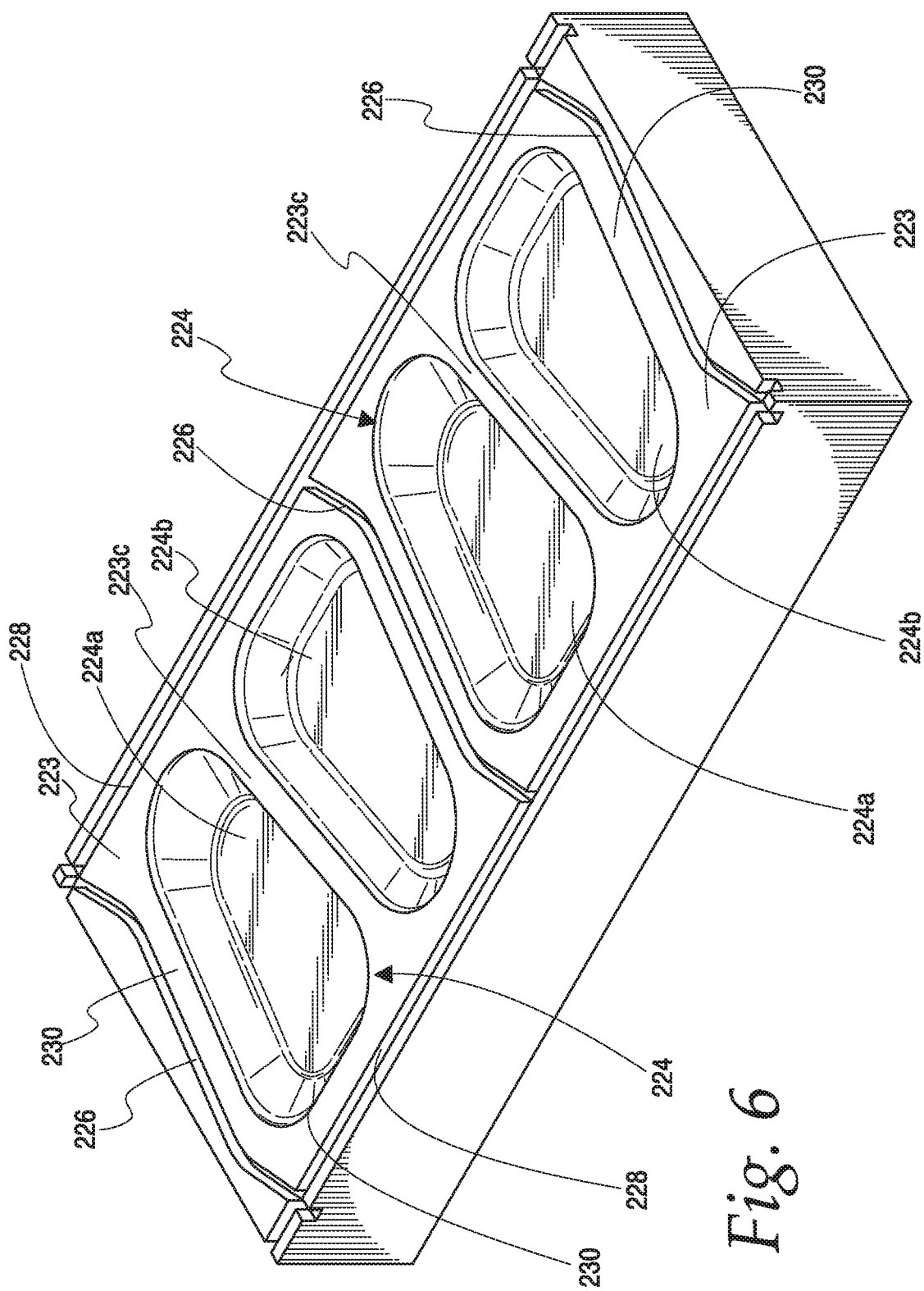
FIG. 6 is a partial perspective view of a portion of a long bar of a base forming drum showing a mold configuration in accordance with the present disclosure.

Referring to FIG. 6, there is shown an illustration of a mold configuration 224 for pouch forming drum 220 that produces a pouch having a modified flange configuration with a unique perimeter edge illustrated in FIGS. 4 and 5. Rather than the typical rectangular flange shape produced with known web slitting and cutting mechanisms, the resultant pouch here has a perimeter flange 211 with a perimeter edge 215 that follows the profile of the mold configuration 224. The illustrative pouch produced by the machine of this disclosure is a multi-compartment pouch with two chambers; however, the principles of this disclosure are equally applicable to single compartment pouches, or pouches with more than two chambers.

FIG. 6 illustrates a portion of one of the long bars 221 illustrated in FIG. 7. A plurality of such long bars 221 are assembled to form a base forming drum 220 as seen in FIG. 7. Grooves 226 and 228 intersect to surround each mold configuration 224 of the base forming drum 220.

With reference to the mold configuration 224 of FIG. 6, two cavity segments 224a and 224b are present, divided by a central divider 223c co-extensive with the outer film support surface 223. These cavities represent two separate chambers of the multi-chamber pouch shown in FIGS. 4 and 5. Notably, these chambers are defined by an irregular pattern perimeter edge 230 of the mold configuration 224.

As best illustrated in FIG. 6, the long bars 221, and consequently the exterior surface of the drum 220, the outer film support surface 223, is provided with radially inwardly directed generally longitudinal or circumferential grooves 226 between each pouch mold configuration 224 (in a given row) and radially inwardly directed generally transverse grooves 228 between each row of mold configurations 224. With the long bars 221 so assembled, the outer film support surface 223 presents a uniform pattern of circumferentially spaced cavities of mold configurations 224 in transversely spaced rows, each surrounded by grooves defining a continuous pattern of intersecting generally circumferential grooves 226 and generally transverse grooves 228. As disclosed herein, such grooves may be non-linear. Thus, in this illustrated embodiment, the grooves represent a departure from prior arrangements, which have previously comprised only linear grooves extending longitudinally and transversely of a base forming drum, such as base forming drum 120 of FIG. 3. Moreover, the grooves of this illustrated embodiment coact with pouch separation system 280 in a new and heretofore unknown manner essential to the disclosed process for removal of individual completed pouches from the continuous web of combined base and lid films.

Referring again to FIG. 6 in this illustration, the transverse grooves 228 are straight, or linear, and arranged parallel to the axis of rotation of the base forming drum 220. However, the longitudinal or circumferential grooves 226 are arranged in a non-linear manner and define a wavy or zig-zag pattern that closely parallels the shape of perimeter edges 230 of the mold configuration cavities. Notably, as illustrated in FIG. 6, the separate mold configurations 220, forming separate pouches, may be nested in the transverse direction along the surface of each long bar 221, reducing the overall width of the base forming drum 220, or alternatively permit inclusion of an additional mold configuration in each row to increase capacity.

The capability for creating pouches in accordance herewith derives from implementation of the separation system 280, including illustrated rotary blade drum assembly 250 described below, which separates the entire pouch from the moving web of films carried on base forming drum 220.

Figure 8:
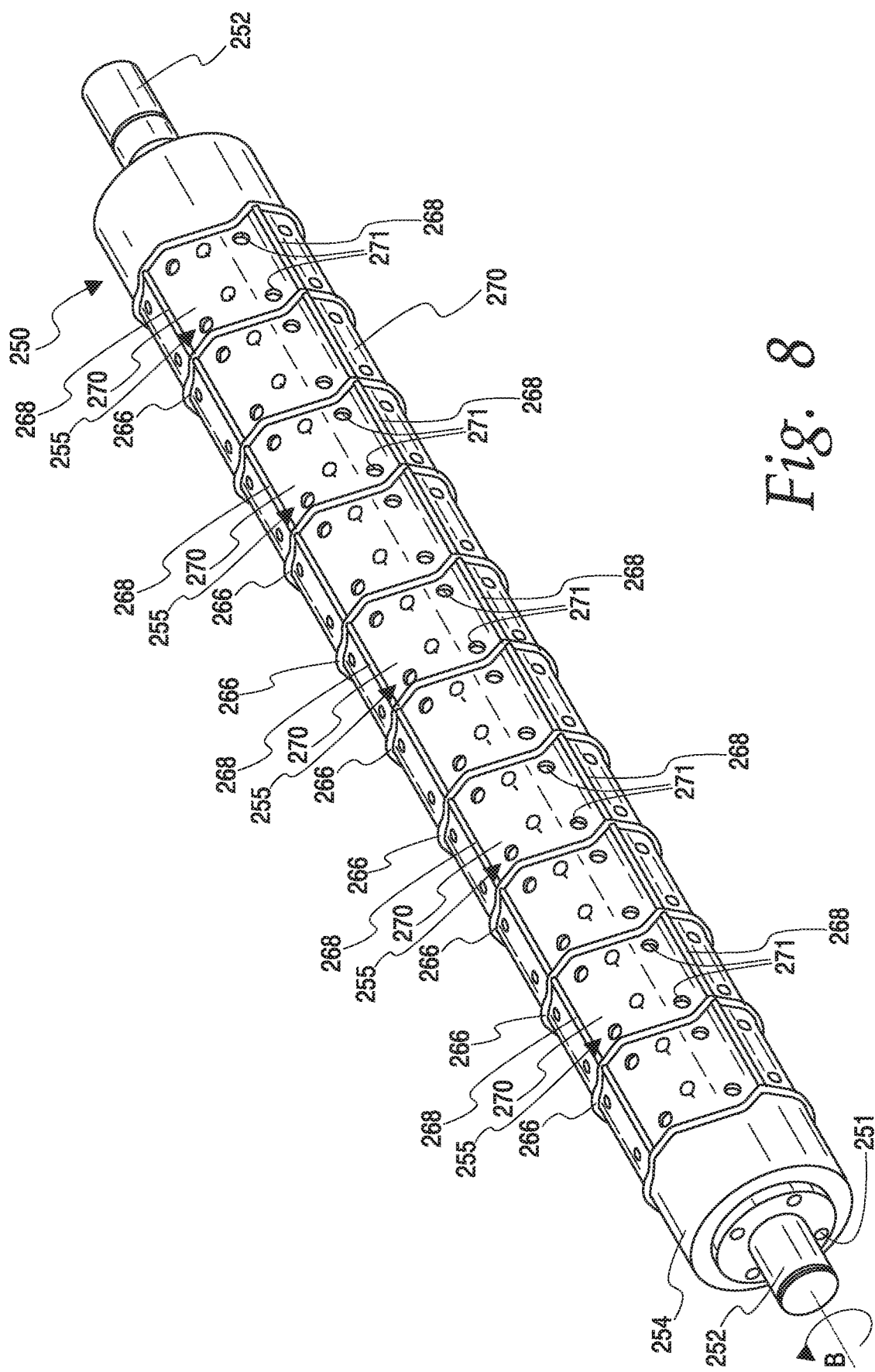
FIG. 8 is a perspective view of a rotary blade drum assembly configured in accordance with the disclosure.
Figure 9:
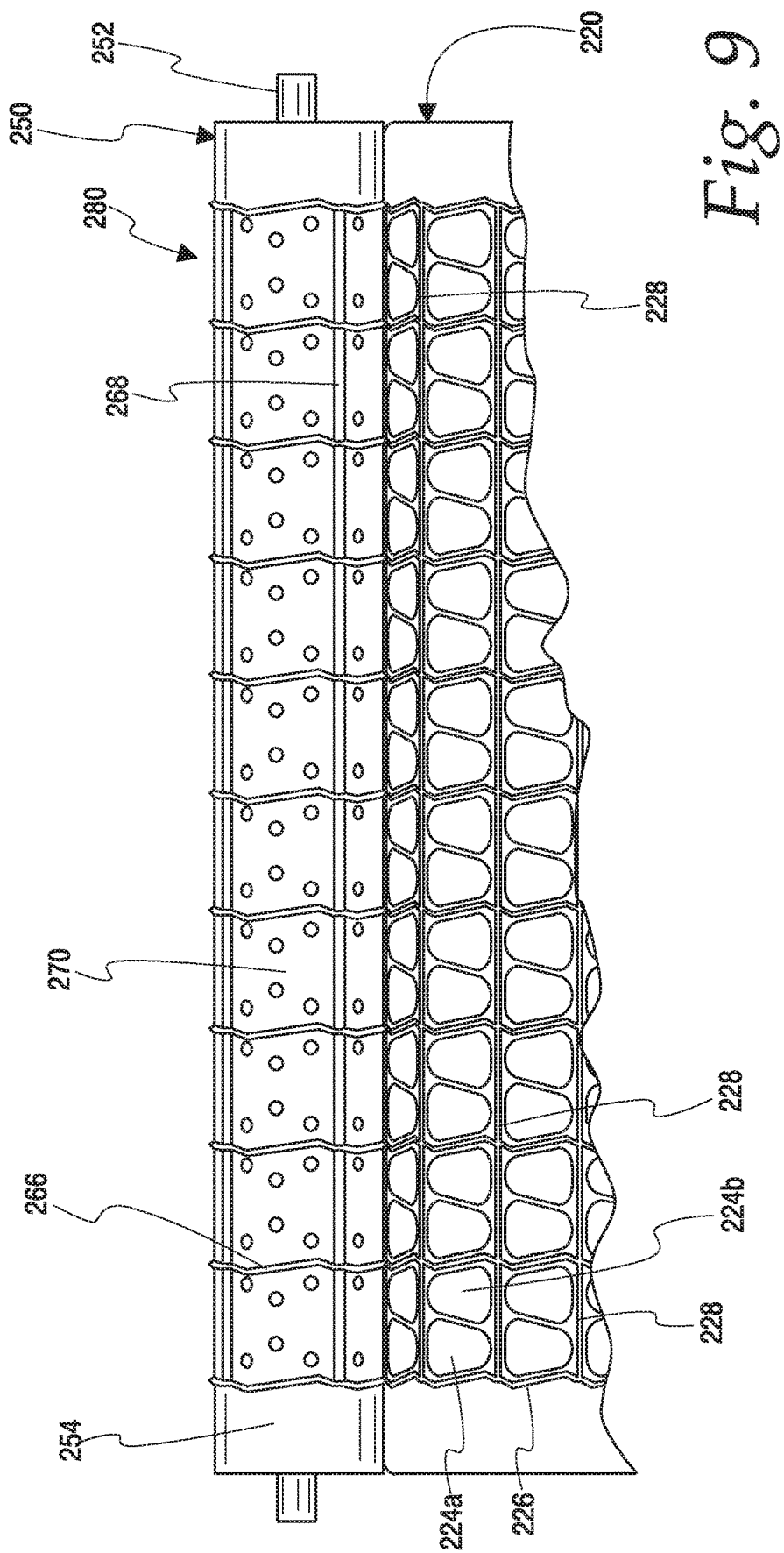
FIG. 9 is a partial plan view of the base forming drum and rotary blade drum assembly shown in FIGS. 7 and 8 illustrating details of the interaction between them.

Referring to FIGS. 8 and 9, illustrated a rotary blade drum assembly 250 is configured to operatively coact with the travelling web of film on base forming drum 220 in register with generally circumferential and generally transverse grooves 226 and 228 to extract individual completed pouches from the film. As illustrated in the drawings, particularly FIG. 3 and FIGS. 8 through 10, the rotary blade drum assembly 250 is mounted in the rotary form, fill and seal machine with its rotational axis aligned with the rotational axis of the base forming drum 220.

Rotary blade drum assembly 250 is positioned downstream of the forming, filling and sealing stations and is thus arranged to engage the travelling web of adhered base and lid films 202 and 204 after formation of filled and sealed pouches 200 integral to the adhered films. As is normal in such a machine, it is contemplated that the base film remains under vacuum within the mold configuration cavities 224 (here 224a and 224b) until an individual pouch 200 is separated from the film. These pouches may then be deposited on a conveyor, such as conveyor 190, shown in FIG. 3, on release of the applied vacuum.

Rotary blade drum assembly 250 is powered by the form, fill and seal machine to rotate in synchronization with the base forming drum 220 and in registry with mold configuration cavities 224, and consequently, the advancing films supported on film support surface 223 of drum 220. Rotary blade drum assembly 250 may be carried by a pneumatic cylinder driven, slidable carriage, for translation toward and away from base forming drum 220 to operatively associate these elements prior to initiation of the pouch separation process. Of course, any other suitable mechanism may be employed to move the rotary blade drum assembly 250 relative to the forming drum 220.

The rotatable forming drum 220 and rotary blade drum assembly 250 may be powered, for example, by synchronous servo-motors with computerized control circuitry to ensure proper operational positioning and interaction. Rotary blade drum assembly 250 may be powered, as previously described, for controlled rotational movement about an axis parallel to the axis of rotation of base forming drum 220 in direction "B" shown in FIG. 8.

As seen in FIG. 8, rotary blade drum assembly 250 has a generally cylindrical roller portion 254 with an elongate bearing shaft 252 extending from its ends. Shaft 252 may be mounted upon previously described axially translatable carriage for controlled positioning in relation to base forming drum 220.

Assembly 250 includes a roller portion 254 having an outer cylindrical drum contact surface 255 defined by resilient insulating pads or guides 270 described more fully below. The roller portion 254 has an axial length generally coextensive with the transverse width of base forming drum 220. When the base forming drum 220 and rotary blade drum assembly 250 are in operative relation to each other, outer cylindrical drum contact surface 255 is in rolling contact with lid film 204 of the travelling web of adhered films 202 and 204. Of course, film 202 is carried upon film support surface 223 of base forming drum 220.

The rotary blade drum assembly 250 is urged toward rotating base forming drum 220 to maintain this operating relationship. The effective diameter of the outer cylindrical drum contact surface 255, defined by the outer surfaces of insulating pads 270, is such that the outer film support surface 223 and the cylindrical drum contact surface 255 of rotary blade drum assembly 250 travel at the same linear velocity.

As seen in FIGS. 8 and 9, rotary blade drum assembly 250 includes generally longitudinal or circumferential blade portions 266 and generally transverse blade portions 268 that extend radially outward of outer cylindrical drum contact surface 255. The blade portions 266 and 268 may be machined or otherwise formed or affixed to rotary blade drum assembly 250. They are formed to interengage with the grooves 226 and 228 machined into the base forming drum 220, both parallel to the axis of the forming drum 220 and circumferentially in the direction of rotation of the forming drum.

In this illustrated embodiment, the blades 266 and 268 include distal ends that extend radially outward of outer cylindrical drum contact surface. Blades 266 and 268 are configured to mesh with the generally circumferential grooves 226 and generally transverse grooves 228 of the base forming drum 220. The grooves 226 and 228 intersect to surround each mold configuration. Consequently, the blade portions 266 and 268 also intersect to define the perimeter edge 215 of pouch 200. Thus, the blade portions 266 and 268 form a separation pattern sized and arranged to engage the web of films and separate a single pouch 200 within each perimeter. The distal edges of the blades extend somewhat beyond the insulating pads 270. This allows the blades to enter the grooves machined into the drum 220 without touching the drum. At maximum penetration, the distal end portions of the blade portions 266 and 268 should enter the grooves 226 and 228 usually about ⅜" (inch) and usually not less than 1/16" (inch). Note that this dimension is important to extraction of each pouch from the travelling web of adhered films 202 and 204. The greater the penetration, the higher the separation force applied to the web of films by the blades 266 and 268 at the tangent line of contact between outer film support surface 223 and generally cylindrical forming drum contact surface 255 of rotary blade drum 250.

The blade portions 268 are arranged in a transverse linear pattern along the transverse length of the rotary blade drum 250. Hence, all pouches in a single long bar 221 are separated from the film simultaneously. In the circumferential direction, the pattern of blade portions 266 advances sequentially as the drums 220 and 250 rotate and follows the zig-zag or wavy pattern laterally in accordance with the desired perimeter shape of the perimeter flange of the pouch to be formed.

As illustrated, the rotary blade drum assembly 250 has four complete patterns of intersecting blade portions 266 and 268 circumferentially of drum 250. The illustrated base forming drum 220 is comprised of forty long bars 221 forming the cylindrical drum outer film support surface 223. Rotary blade drum assembly 250 has a diameter substantially smaller than the diameter of base forming drum 220 with blades 266 and 268 in register with grooves 226 and 228. As explained, the outer film support surface 223 and outer cylindrical drum contact surface 255 travel at the same linear velocity to maintain synchronous registry between the blades 266 and 268 and grooves 226 and 228.

Figure 10:
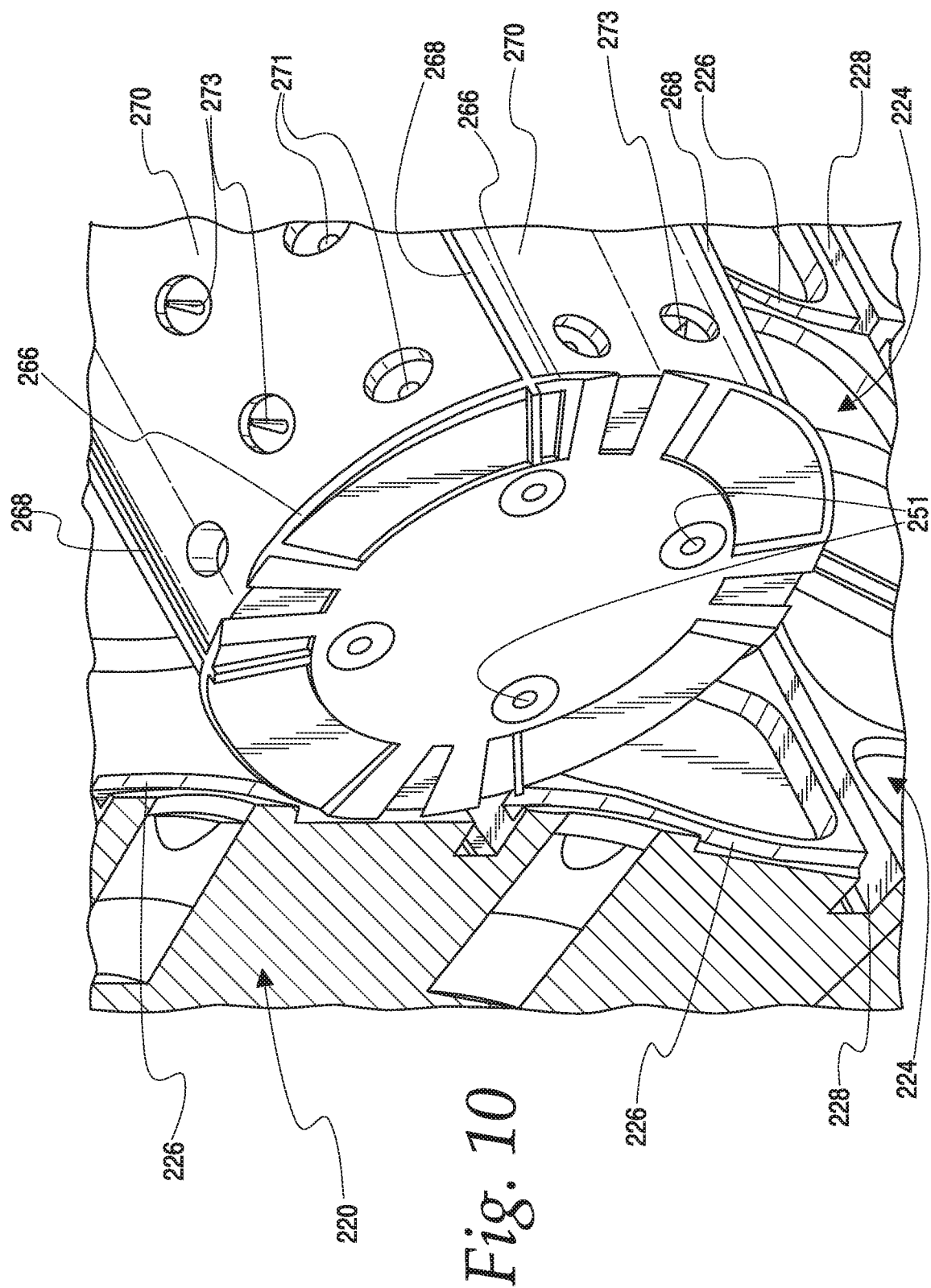
FIG. 10 is a perspective view similar to FIG. 9 on an enlarged scale.

It should be noted that in order to efficiently separate the web of adhered films and pouches, the rotary blade drum assembly 250 includes axial bores into which are inserted wound cartridge resistive heating elements 251, seen in FIG. 10. These heaters heat blade portions 266 and 268 to a temperature sufficient to melt and puncture the web of adhered films on contact, usually between 300° and 400° F. Of course, any suitable known heating arrangements may be utilized to heat the blades of blade drum assembly 250.

To prevent the heated rotary blade drum 250 from damaging the pouches during the separation process, each intermediate area within the perimeter defined by intersecting circumferential and transverse blade portions 266 and 268, is provided with insulating material in the form of the pads or blocks 270. These pads protect the pouches within the area defined by the intersecting blades from undesired contact with metal elements of rotary blade drum assembly 250. FIGS. 8 and 9 best illustrate the pads 270 positioned within the space defined by blade portions 266 and 268. Importantly, the insulating pads 270 contact each formed pouch and urge the pouches toward the associated mold configuration in the base forming drum 220 during the separation process to prevent the tensioned film from prematurely recovering and changing the shape of the pouch or causing pouch movement, which could adversely affect pouch separation effectiveness or result in damage to the separated pouches. The function of pads 270 and exemplary structural integration to the rotary blade drum assembly 250 is fully disclosed in previously mentioned U.S. Pat. No. 9,162,413.

As illustrated here, generally circumferential blade portions 266 and generally transverse blade portions 268 may be machined upon a solid cylindrical metal roller portion 254. Separate insulating pads or blocks 270 may be secured within the cavity surrounded by each intersecting set of blade portions 266 and 268 by fasteners 271, best seen in FIG. 10. Such insulating pads may be made of silicone and have a durometer of 40 to 80. They may have a radial thickness of ½" (inch) or more. The pads may be made of any suitable material to perform the disclosed functions.

FIGS. 9 and 10 best illustrate the interrelation between the grooves 226 and 228 of base forming drum 220 and the blade portions 266 and 268 of rotary blade drum 250. Importantly, these rotary elements are disposed on opposite sides of the travelling web of films 202 and 204 with their respective axes of rotation spaced such to ensure that the distal ends of blade portions 266 and 268 are in registry to fully enter grooves 226 and 228, but without contact with the drum 220. This relationship, in turn, ensures a clean (sharply defined) perimeter edge of the separated pouches.

FIG. 9, in particular, illustrates the wavy or zig-zag pattern of the generally circumferential grooves 226 of drum 220 and blade portions 266 of rotary blade drum assembly 250. It also shows how the grooves 226 and 228 and blade portions 266 and 268 completely surround each mold configuration cavity 224 of base forming drum 220.

For illustrative and descriptive purposes, in reference to FIG. 4, based on the direction of rotation of the forming drum 220 and direction of travel of the web of adhered films, the transverse edge portion 214L of pouch 200 is the leading edge and the transverse edge portion 214T is the trailing edge. During separation of a pouch from the travelling web of films 202 and 204 by the pouch separation system 280, the leading edge portion 214L is formed or separated first, followed by progressive separation along the longitudinal edge portions 212. Finally, system 280 forms transverse edge portion 214T to completely separate a pouch 200 from the adhered films. As the drum 220 and accompanying film advances, blade portions 266 and 268 of rotary blade drum assembly 251 separate each pouch along irregularly shaped perimeter edges of the surrounding flange of adhered base and lid films. As can be seen in the illustrations of FIGS. 8 and 9, the transverse blade portions 268 parallel to the axis of rotation of the rotary blade drum assembly 250 are disposed in a straight or linear fashion, as are the generally transverse grooves 228. The longitudinal blade portions 266 in the circumferential direction of the drum 220 are formed in a wavy line corresponding to the pattern for the grooves 226 machined into the drum 220, (which follow the pattern of the perimeter edge portions 212 of the mold cavities 224).

It should be understood that the separation process disclosed does not involve a "cutting" such as a physical crush or shearing of the web of films. Rather, it is a "melt" process in that the distal edges of blade portions 266 and 268 operate at a temperature above the melting point of the films. The distal edges penetrate the adhered web of films and enter, but do not contact, surfaces grooves 226 and 228 of the base forming drum 220. These edges separate each of the pouch configurations from the travelling web without contact with the base forming drum 220.

The uncut sheets of PVA or other film formed with integral completed pouches is carried on the surface 223 of the forming drum 220. The pouches are held within the cavities of the mold configuration 224 and the combined base and lid films 202 and 204 are stretched taut against the smooth outer surface of drum 220. When the heated blade portions 266 and 268 of rotary blade drum assembly 250 enter the grooves 226 and 228, they melt through the film creating clean separation completely surrounding the pouch to form pouch perimeter edge 215. The preferred cutting temperature range is 300° F. to 400° F.

The distal edges of blade portions 266 and 268 may taper to a relatively sharp edge, about 1/32" (inch) or so. The shape concentrates the application of heat to the travelling web of adhered films to enhance penetration and formation of a precise edge for the pouch flange.

As seen in FIG. 10, in some applications, such as packaging particulate matter, radial perforator pins 273 may be employed in the space between the blade portions 266 and 268. They may be positioned in apertures in each pad or block 270 to form microscopic pinholes in the lid film 204 during the separation process to allow trapped gases to escape the formed pouches. These perforated holes are small enough to prevent any particulate product content to escape from the pouches.

Importantly, in accordance with the disclosure, the shape of the grooves 226 and 228 and of the blade portions 266 or 268 can be machined into any pattern desired. The example of a pouch with an irregular shaped perimeter flange illustrated by FIGS. 4 to 6 of this disclosure is exemplary of the capabilities available through implementation of the principles described.

Figure 11:
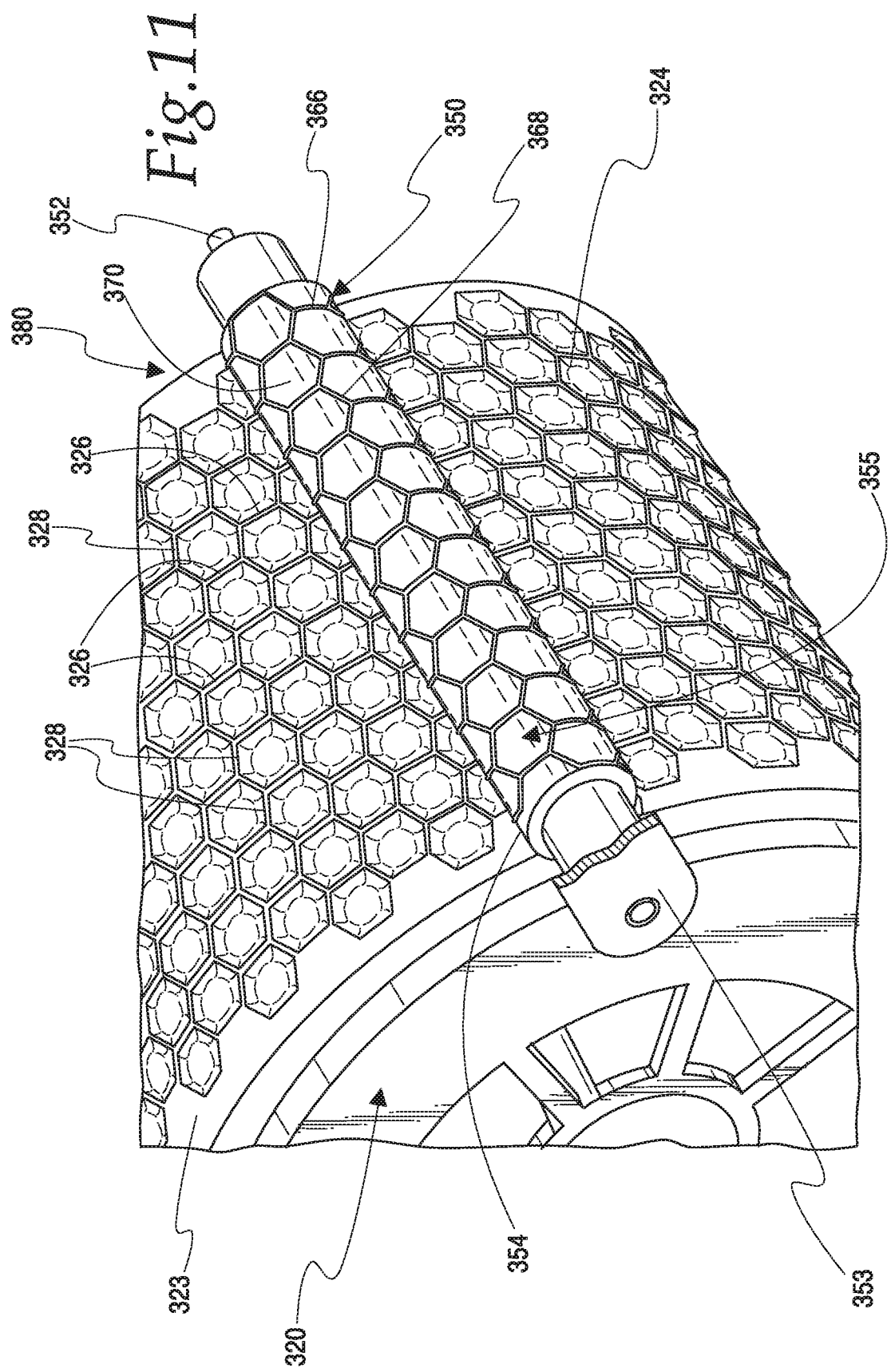
FIG. 11 is a perspective view of a rotary drum and rotary blade drum component of a rotary form fill and seal packaging machine illustrating the principles of the present disclosure in an alternative form.

FIG. 11 shows another shape that could be created with a pouch separation system 380 having a rotary blade drum assembly 350 operatively associated with rotary forming drum 320 containing a pattern of mold configurations 324. Rotary blade drum assembly 350 may be supported with its rotational axis aligned with the rotational axis of forming drum 350 upon an axially translatable bracket 353 illustrated in FIG. 11. It is controlled to coact with forming drum 320 in synchronous registration, as earlier described in connection with the embodiment of FIGS. 7 to 10.

Blade drum assembly 350 includes a roller portion 354 upon which are positioned generally circumferential and generally transverse blade portions 366 and 368 defining a pattern to form the perimeter edges of flanges of formed pouches. As illustrated, the base forming drum 320 has grooves positioned in a complementary pattern to the blade portions 366 and 368 of rotary blade drum assembly 350.

Pouch shapes, as in the example of FIG. 11, derive from a unique shape of a mold configurations 324 on film support surface 323 of forming drum 320. Each mold configuration or cavity 324 is surrounded by generally circumferential and transverse grooves 326 and 328. These grooves define a tessellated pattern with six (6) sided hexagonal perimeter edges.

Similarly, an illustrated rotary blade drum assembly 350 is provided with generally circumferential and transverse blade portions 366 and 368 in a complementary pattern. Thus, the generally longitudinal and transverse pattern of grooves surrounding each mold configuration 324 and the corresponding pattern of generally longitudinal and generally transverse blade portions 366 and 368 of the blade drum assembly 350 are "non-linear" in that they are not in all respects parallel to the longitudinal or transverse extent of the forming drum 324 or travelling web of adhered films.

Importantly, in this embodiment, the pattern of grooves and blades encompasses nearly the entire surface 323 of the base forming drum 320 and consequently the travelling web of adhered films, thereby minimizing film scrap and consumption. The perimeter flange surrounding a completed pouch may be minimized, closely following the perimeter edge of the completed pouches. There is thus a film savings may result from using the shaped pouch separation system 380 presented in this disclosure. It is contemplated that any number of intricate patterns could be nested to form a mosaic pattern to, for example, eliminate any ribbons of scrap between longitudinal rows of mold configurations.

Figure 12:
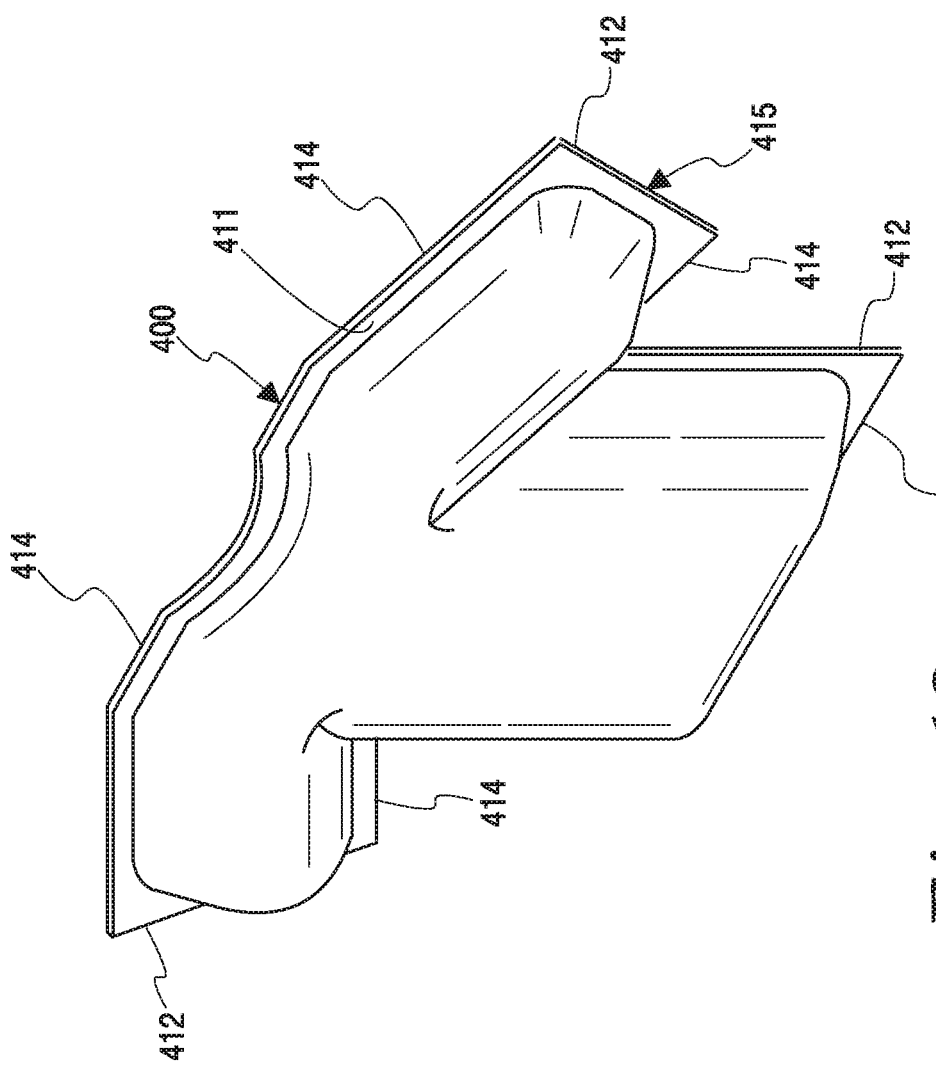
FIG. 12 is a perspective view of a flexible product containment pouch made in accordance with the principles of the present disclosure.
Figure 13:
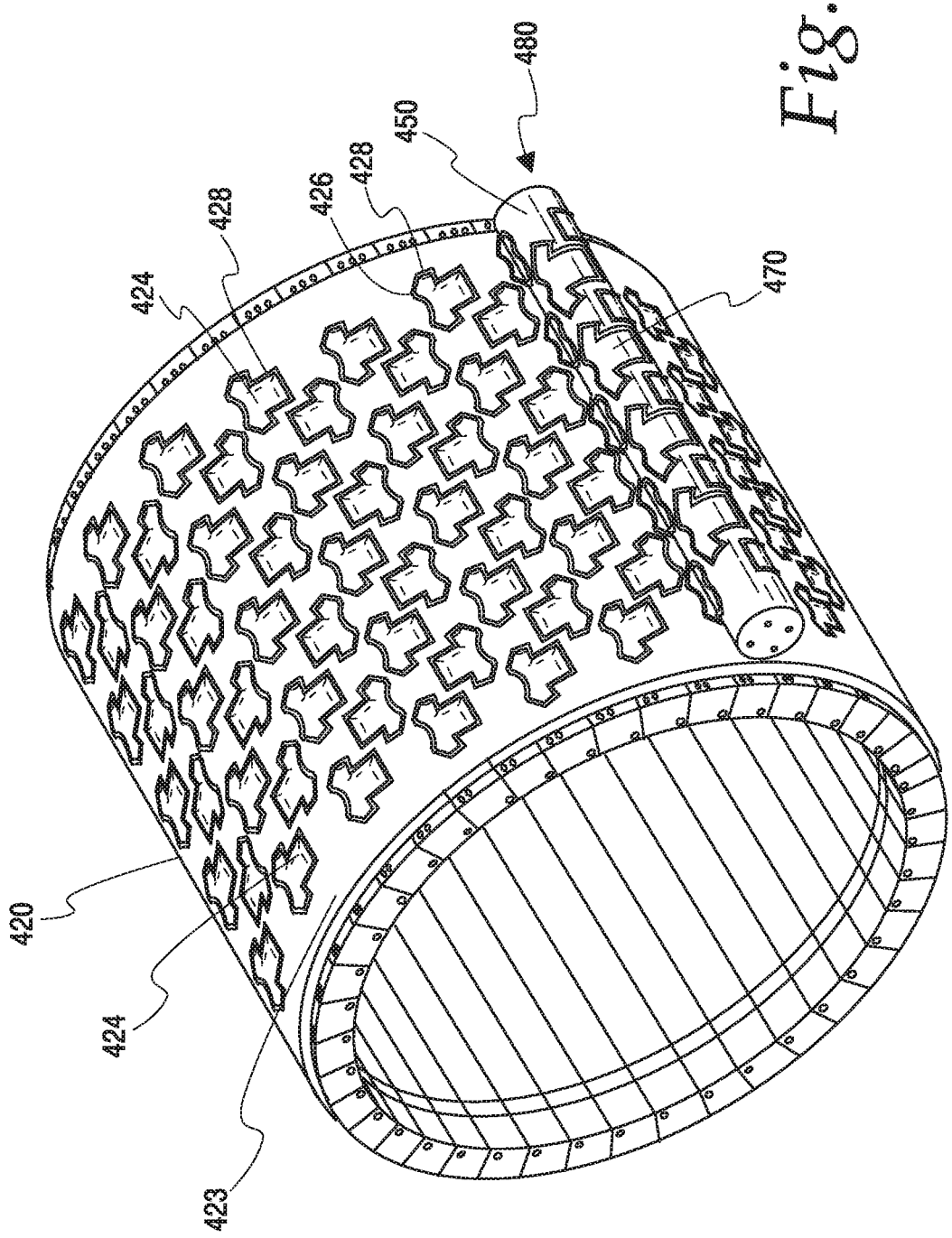
FIG. 13 is a partial view in perspective of a pouch separation apparatus in accordance with the disclosure for making pouches illustrated in FIG. 12.
Figure 14:
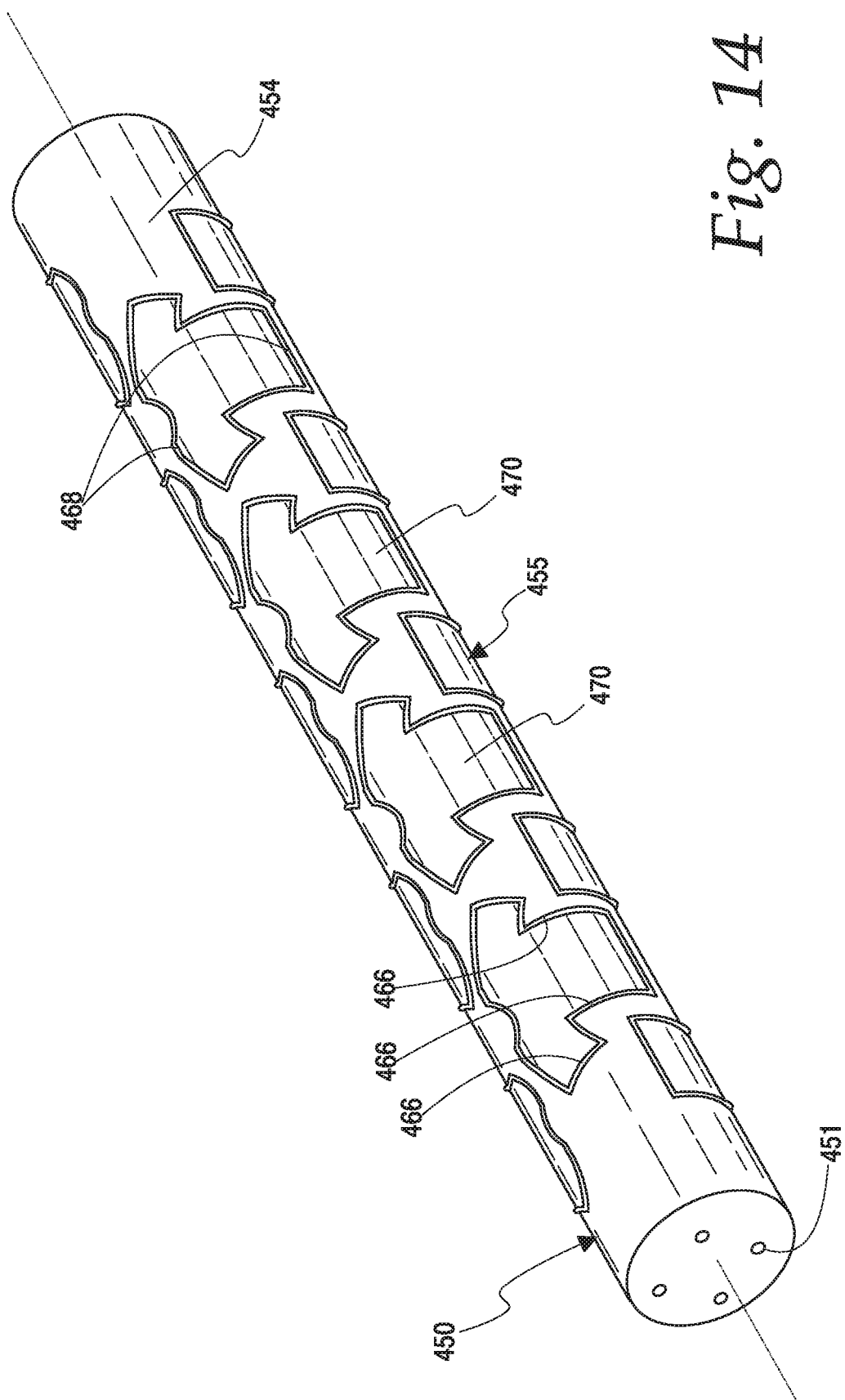
FIG. 14 is a perspective view of a portion of the apparatus of FIG. 13 illustrating various features of the disclosure.

FIGS. 12 to 14 are illustrative of another unique pouch forming capability from application of the principles disclosed here.

FIG. 12 shows a product containing pouch 400 of complex configuration produced from flexible film, such as water-soluble PVA. Here, a form fill and seal machine is employed that is similar to that illustrated in FIG. 3 with a pouch separation system 480 as modified in accordance with this disclosure. The pouch 400 may include a filled, hollow product component volume surrounded by a flange 411 of adhered base and lid films having a perimeter edge 415. The illustrated pouch has a "T-Shirt" shape with a flange 411 having a perimeter edge 415 comprising generally longitudinal edge portions 412 and generally transverse edge portions 414.

As seen in FIG. 13, a base forming drum, generally 420, includes a cylindrical outer film support surface 423 with multiple transverse rows of mold configurations 424 defining cavities to form product receiving base pockets of the pouches 400 seen in FIG. 12. Each mold configuration 424 is surrounded by a continuous pattern of generally longitudinal grooves 426 and generally transverse grooves 428 arranged in a non-linear manner to create the "T" shirt shape.

Notably, though the pattern of mold configurations 424 extends transversely in rows that circumferentially surround the outer film support surface 423, the grooves surrounding each mold configuration are spaced from the grooves of other mold configurations. The pattern is illustrative of an option available employing the principles disclosed here. The pattern of mold configurations 424 is a mosaic of individual spaced apart elements. In this illustration, each row of mold configurations is a "mirror image" of adjacent rows.

In accordance with the principles here disclosed, a travelling web of adhered films with integral filled and sealed pouches 400, within mold configurations 424, is carried by the outer film support surface to a separation station 480, shown in FIG. 14. It comprises a rotary blade drum assembly 450, best seen in FIG. 13, disposed in operative association with base forming drum 420. It is mounted for adjustable movement relative to base forming drum 420 and powered to rotate in controlled synchronous registry with the grooves 426 and 428 of base forming drum 420, as previously described in connection with the embodiment of FIGS. 4 to 10. It should be noted that the rotary blade drum 350 and base forming drum 320 of the embodiment of FIG. 11 are, of course, similarly configured and arranged in a rotary form, fill and seal pouch forming machine.

In FIG. 14, there is illustrated rotary blade drum assembly 450 of the pouch separation system 480 of FIG. 13. It is mounted in a rotary form, fill and seal pouch forming machine in operative association with outer film support surface 423 for controlled functional coaction, all as herein previously described.

Assembly 450 includes a roller portion having an outer cylindrical drum contact surface 455 defined by radially outer surfaces of resilient insulating pads or guides 470, as previously described in connection with the embodiment of FIGS. 9 and 10. The roller portion has an axial length generally coextensive with the transverse width of base forming drum 420. When the base forming drum 220 and rotary blade drum assembly 450 are in operative relation to each other, outer cylindrical drum contact surface 455 is in rolling contact with the travelling web of adhered films carried upon outer film support surface 423 of base forming drum 420. The rotary blade drum assembly 450 is urged toward rotating base forming drum 420 to maintain this operating relationship. The effective diameter of the outer cylindrical drum contact surface 455, defined by the outer surfaces of silicone pads 470, is such that the outer film support surface 423 and the cylindrical drum contact surface 455 travel at the same linear velocity.

As seen in FIG. 14, rotary blade drum assembly 450 includes generally longitudinal or circumferential blade portions 466 and generally transverse blade portions 468 that extend radially outward of outer cylindrical drum contact surface 455. The blade portions 466 and 468 may be machined or otherwise formed or affixed to rotary blade drum assembly 450. They are configured to interengage or mesh with the grooves 426 and 428 of the base forming drum 420, as in the earlier embodiments.

Blades 466 and 468 include distal end portions that extend radially outward of outer cylindrical drum contact surface 455 and are configured to mesh with the generally circumferential grooves 426 and generally transverse grooves 428 of the base forming drum 420. They, consequently, define the perimeter edge 415 of pouch 400. Thus, the blade portions 466 and 468 form a separation perimeter sized and arranged to engage the travelling web of films on other film support surface 423 and separate individual pouches 400 within each perimeter. The distal edges of the blades 466 and 468 extend beyond the silicone insulation pads 270 and enter the grooves machined into the drum 420 without touching the drum or surfaces defining grooves 426 or 428.

As illustrated, the rotary blade drum assembly 450 has four complete patterns of intersecting blade portions 466 and 468 circumferentially of drum 450 and has a diameter substantially smaller than the diameter of cylindrical outer film support surface 423 of base forming drum 420. With blades 466 and 468 in register with grooves 426 and 428, the outer film support surface 423 and outer cylindrical drum contact surface 455 travel at the same linear velocity to maintain synchronous registry.

As in the earlier embodiments, the rotary blade drum assembly 450 includes inserted wound cartridge resistive heating elements 451, represented in FIG. 13, that heat blade portions 466 and 468 to a temperature sufficient to melt the web of films on contact, usually between 300° and 400° F.

To prevent the heated rotary blade drum or roller 450 from damaging the pouches during the separation process, each intermediate area within the perimeter defined by intersecting generally circumferential and transverse blade portions 466 and 468, is provided with insulating material in the form of the silicone pads or blocks 470. These pads protect the pouches within the area defined by the intersecting blades from undesired contact with metal elements of rotary blade drum assembly 450. During separation from the travelling web of adhered films, the silicone pads 470 contact each pouch being separated and urge the pouches toward the associated mold configuration 424 in the base forming drum 420 to prevent the tensioned film of the pouch from prematurely recovering and changing the shape of the pouch or causing pouch movement that would cause contact with the blade portions 466 and 468.

With reference to the above description and disclosure, it must be understood that the illustrated base forming drums 220, 320 or 420 are substituted for the base forming drum 120 of the machine of FIG. 3. During pouch forming, these drums support a base film that, in the usual manner, is drawn into the plurality of mold configurations 224, 324 or 424 under applied heat and vacuum. These base pockets are then filled with product and covered with a lidding film again in the usual manner of forming such flexible pouches. One or both of the base film and lid film are wetted or coated with adhesive to ensure adherence between contacting surfaces to form sealed product containing chambers or pouches. While under continued vacuum within the mold configuration cavities, the moving web of adhered films and interspersed pouches is delivered to a separation mechanism in accordance with the present disclosure. The heated rotary blade drum assembly 250, 350 or 450, with specially shaped longitudinal blade portions 266, 366 or 466 and transverse blade portions 268, 368 or 468 coact with the associated generally circumferential and transverse grooves of the base forming drum 220, 320 or 420 and melt the film on contact to separate entire pouches from the film web. The pouches are retained in the base drum mold cavities until the vacuum is released at which time the pouches are released and delivered to a conveyor for further processing or packaging. Each resultant pouch emerges with a perimeter flange defined by the blade portions 266 and 268, 366 and 368, or 466 and 468 of rotary blade drums 250, 350 or 450, as already explained.

It should also be understood that equipment illustrated in FIG. 3 is also intended to function as described herein. In this regard, pouch separation station 180 includes blade drum assembly 150 provided with longitudinal blade portions and transverse blade portions aligned to coact in synchronous registration with the intersecting grooves surrounding the mold configurations in the outer film support surface 123 of base forming drum 120. The blade drum assembly 150 may, in all other respects, structurally and functionally duplicate the blade drum assembly 250 of separation station 280, described herein in detail.

In the example shown in FIGS. 4 to 9, transverse groove portions 228 and transverse blade portions 268 are arranged in a linear pattern. However, these groove and blade portions could also be irregularly shaped to provide a unique separation pattern transverse of the base forming drum 220 and travelling web of films. In that instance, a specially shaped edge 214 would be created upon the pouch flange 211. It should be understood that the embodiments illustrated herein are only illustrative and numerous other pouch separation system component configurations may be derived or implemented in accordance with the principles of this disclosure.

Notably, the rotary blade drums 250, 350 or 450 operate at elevated temperatures, and the temperature of base forming drums 220, 320 or 420 may also be minimally elevated. Therefore, in sizing and forming the blade portions to maintain registry with the pattern of grooves on the associated base forming drums, it is necessary to accommodate thermal expansion or size change of the machine components. One successful approach has been to make calculations based on a fixed end of the shaft upon which the rotary drum rotates relative to the position of the rotating base forming drum to determine applicable expansion factors.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. Apparatus for separating product containing pouches from a travelling web of adhered films comprising:
    a film support surface carrying the adhered films and provided with pouch forming mold configurations having a perimeter edge at said film support surface defining the cavity of each mold configuration;
    said film support surface including groove portions between said mold configurations surrounding each said mold configuration;
    said groove portions defining a pattern that parallels the shape of the perimeter edge of the cavity of each mold configuration;
    a rotary blade drum assembly in operative relation with said film support surface having blade configurations with blade portions arranged to form the entire perimeter edge of a flange of the pouch;
    said blade portions disposed in synchronous registration with said groove portions of said film support surface, with distal ends arranged to enter said groove portions of said film support surface,
    rotation of said rotary blade drum causing said distal ends of said blade portions to enter said groove portions through said travelling web of adhered films and form said perimeter edge of the flange of the pouch and separate said pouch pouches from the travelling web of adhered films.

2. Apparatus for separating product containing pouches from a travelling web of adhered films as claimed in claim 1, wherein a rotatable forming drum includes said film support surface.

3. Apparatus for separating product containing pouches from a travelling web of adhered films as claimed in claim 2, wherein said film support surface includes intersecting generally longitudinal groove portions and generally transverse groove portions between said mold configurations, and said rotary blade drum assembly includes intersecting generally longitudinal blade portions and generally transverse blade portions configured for synchronous registration with said generally longitudinal and generally transverse groove portions.

4. Apparatus for separating product containing pouches from a travelling web of adhered films as claimed in claim 3, wherein said forming drum includes a plurality of said mold configurations arranged in circumferential rows spaced transversely of said film support surface.

5. Apparatus for separating product containing pouches from a travelling web of adhered films as claimed in claim 4, wherein at least one of said generally longitudinal blade portions or generally transverse blade portions for synchronous registration with each of said groove portions is non-linear relative to the longitudinal or transverse extent of said forming drum or travelling web of adhered films.

6. Apparatus for separating product containing pouches from a travelling web of adhered films as claimed in claim 4, wherein said rotary blade drum assembly includes heating elements to heat said blade portions to a temperature in the range of 140° to 400° F.

7. Apparatus for separating product containing pouches from a travelling web of adhered films, as claimed in claim 4, wherein said rotary blade drum assembly includes insulating pads disposed within each blade configuration said insulating pads arranged to define a contact surface disposed to contact pouches being separated from said travelling web of adhered films.

8. Apparatus for separating product containing pouches from a travelling web of adhered films, as claimed in claim 7, wherein said forming drum and rotary blade drum assembly are arranged such that said film support surface of said forming drum and said generally cylindrical forming drum contact surface of said rotary blade drum contact opposite sides of said travelling web of adhered films and said surfaces travel at the same linear velocity.

9. A rotary blade and forming drum assembly for separating product containing pouches from a travelling web of adhered films comprising:
- a film support surface on said forming drum provided with a plurality of pouch forming mold configurations having a perimeter edge at said film support surface defining the cavity of each mold configuration and groove portions, including intersecting generally longitudinal groove portions and generally transverse groove portions between said mold configurations:
- said groove portions defining a pattern that parallels the shape of the perimeter edge of the cavity of each mold configuration;
- a rotary blade drum assembly having a plurality of blade configurations each with blade portions including intersecting generally longitudinal blade portions and generally transverse blade portions arranged to form the entire perimeter edge of the flange of a pouch;
- said blade portions disposed for synchronous registration with the groove portions in the film support surface in the forming drum, with distal ends arranged to enter said groove portions of said film support surface,
- rotation of said forming drum and said rotary blade drum causing said distal ends of said blade portions to enter said groove portions through the travelling web of adhered films and form the perimeter edge of the flange of the pouch and separate pouches from the travelling web of adhered films.

10. A rotary blade and forming drum assembly, as claimed in claim 9, wherein said rotary blade drum assembly includes insulating pads disposed within each blade configuration, said insulating pads include a contact surface to contact pouches during separation from said travelling web of adhered films, and wherein said rotary blade drum includes heating elements to heat said blade portions.

11. A rotary blade and forming drum assembly for separating product containing pouches from a travelling web of adhered films as claimed in claim 9, wherein said longitudinal groove portions and longitudinal blade portions are non-linear relative to the longitudinal extent of the forming drum or travelling web of adhered films.

12. A rotary blade and forming drum assembly for separating product containing pouches from a travelling web of adhered films, as claimed in claim 9, wherein said multiple blade configurations are nested in the transverse direction with a longitudinal blade portion of each blade configuration comprising a longitudinal blade portion of an adjacent blade configuration.

* * * * *